United States Patent [19]
Sato

[11] Patent Number: 5,130,591
[45] Date of Patent: Jul. 14, 1992

[54] SHADED POLE MOTOR

[75] Inventor: Hironobu Sato, Ohta, Japan

[73] Assignee: Sanyo Electric Co., Ltd., Osaka, Japan

[21] Appl. No.: 442,991

[22] Filed: Nov. 29, 1989

[30] Foreign Application Priority Data

Jan. 19, 1989 [JP] Japan ................................ 1-10217
Aug. 11, 1989 [JP] Japan ............................... 1-208071

[51] Int. Cl.⁵ ........................ H02K 17/70; H02K 1/12
[52] U.S. Cl. .................................... 310/172; 310/187; 310/254
[58] Field of Search ............. 310/40 MM, 49 R, 172, 310/179, 161, 162, 187, 190, 193, 254

[56] References Cited

U.S. PATENT DOCUMENTS

| | | | |
|---|---|---|---|
| 1,934,981 | 11/1933 | Johnson | 310/172 |
| 2,492,207 | 12/1949 | Ballentine | 310/172 |
| 3,196,303 | 7/1965 | Rowland et al. | 310/218 |
| 4,011,475 | 3/1977 | Schmider | 310/156 |
| 4,162,418 | 7/1979 | Kawaki et al. | 310/49 R |
| 4,386,287 | 5/1983 | Karasawa et al. | 310/162 |
| 4,565,955 | 1/1986 | Kubota | 310/162 |
| 4,600,864 | 7/1986 | Sato | 310/156 |

FOREIGN PATENT DOCUMENTS

| | | |
|---|---|---|
| 1942765 | 3/1971 | Fed. Rep. of Germany ...... 310/172 |
| 59-39980 | 9/1984 | Japan . |

Primary Examiner—Steven L. Stephen
Assistant Examiner—C. LaBalle
Attorney, Agent, or Firm—Wenderoth, Lind & Ponack

[57] ABSTRACT

A shaded pole motor includes a squirrel-cage rotor and a stator assembly. The stator assembly having a bore for rotatably receiving the rotor and pole separation parts on an inner circumference of the bore so that adjacent separated portions are excited alternately to an N-pole and an S-pole when a winding is energized. The inner circumference of the bore is divided into plural sections represented by $2(2n+1)$. The magnetically divided two pole portions have pole sections having an alternating N-pole and S-pole, and non-pole sections, when a winding of the stator is energized.

7 Claims, 2 Drawing Sheets

SHADED POLE MOTOR

BACKGROUND OF THE INVENTION

The present invention relates in general to a shaded pole motor having a stator assembly having two pole portions magnetically separated by a pair of pole-separation parts and, more particularly, to the stator assembly of the shaded pole motor.

A conventional shaded pole motor is disclosed in, for example, Japanese Patent Publication No. 59-39980, published Sept. 27, 1984. Such a shaded pole motor has a bore for rotatably receiving a squirrel-cage rotor. The bore is magnetically divided by pole separation grooves so that each divided portion has different magnetic poles with respect to adjacent portion and each of the poles has a shading coil to provide a delay in magnetic excitation so that the rotor is driven by a rotational magnetic field produced by the excitation delay caused by the shading coil.

The conventional shaded pole motor as described above has a rotational magnetic field effected by a pair of shading coils and, accordingly, the motor is substantially a so-called two-pole motor, which produces a large cogging, and consequently, large vibration and noise have been produced during low rotational speeds. Further, the maximum number of rotor rotations (N) is fixed at the condition of no-load as shown by:

$$N = \frac{120f}{p} \text{ (rpm)},$$

wherein f is a frequency of a power source and p is the number of magnetic poles. In case of rotation with a load, the number of rotation will be less than the value of N (without a load) due to losses caused by slip, etc., of the rotor.

SUMMARY OF THE INVENTION

An object of the present invention is to provide an improved shaded pole motor which enables a substatial multi-polarization with a simple construction of the stator and selective determination of the number of rotations of the rotor without increasing the number of poles.

According to the present invention, there is provided a shaded pole motor including squirrel-cage rotor and a stator assembly. The stator assembly includes a stator core, a bore for rotatably receiving the rotor, pole separation device for magnetically separating an inner circumference of the bore into two pole pieces, a yoke core coupled to the stator core, a single winding wound on the yoke core for magnetizing the two pole pieces in an N-pole and an S-pole when the winding is energized, and a plurality of shading coil slots formed on the inner circumference of the bore so that the shading coils are associated with the pole pieces. Each piece of the two pieces is magnetically divided into plural sections represented by 2n+1, wherein n is an integer more than 1 inclusive, so that the sections have pole pections for providing a magnetic flux to the rotor for rotation thereof and non-pole sections for providing no magnetic flux for rotation to the rotor, and the pole sections and the non-pole sections are arranged alternately so that the pole sections are formed at th sections adjacent to the pole separation devices.

Alternatively, each of the two pole pieces separated by the pole-separation devices is divided into three sections including two pole portions having an N-pole and an S-pole alternately when the winding is energized and a non-pole portions having no magnetic polarity when the winding is energized, the pole portions have shading coils.

In a preferred embodiment, each pole section has a main portion, a sub-portion having a larger air gap relative to an outer circumference of the rotor, and a shaded portion of the shading coil.

In the present invention, an offset angle between the adjacent pole sections relative to the pole separation devices can be made small and, accordingly, a desired mechanical angle of substantial "multi-pole" construction is realized, similar to the conventional multi-pole motor construction. This mechanical angle is determined by selecting the mechanical angle of the non-pole section and, accordingly, a desired shaded pole motor having a predetermined synchronous speed by selectively changing the mechanical angle between the pole sections.

DETAILED DESCRIPTION OF PREFERRED EMBODIMENTS

Figure 1:
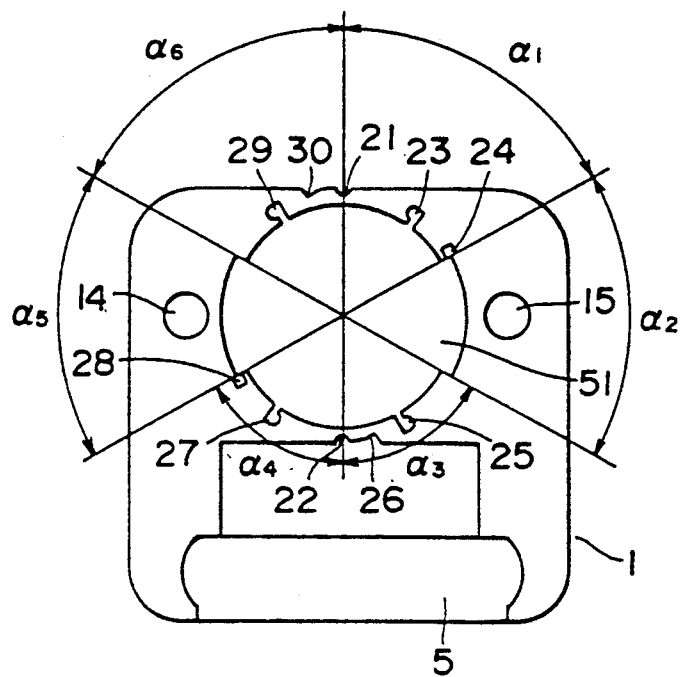
FIG. 1 is a front view of a core used on a stator of a shaded pole motor according to the present invention.
Figure 2:
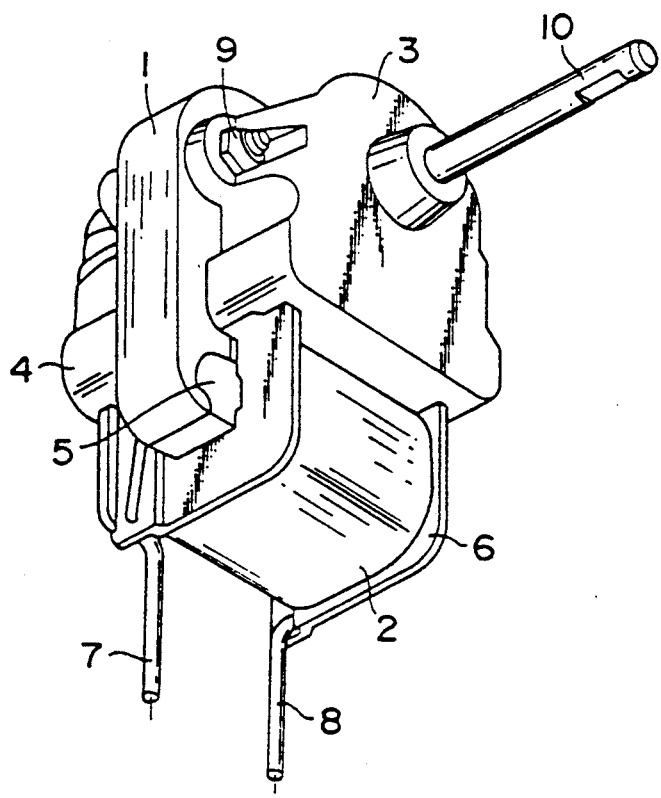
FIG. 2 is a perspective view of the motor showing bearing parts mounted on the stator and a rotor of the motor.
Figure 3:
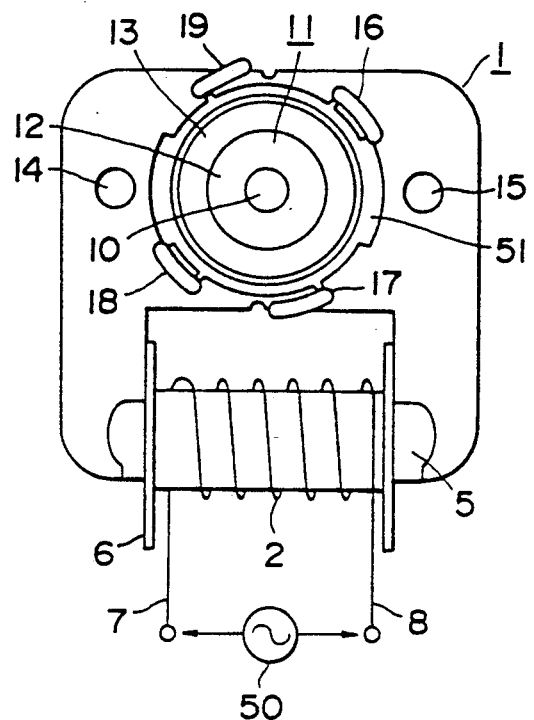
FIG. 3 is a front view of a stator and a rotor according to the invention.

Referring first to FIGS. 1, 2 and 3, the shaded pole motor of the present invention includes a stator 1, which is preferably a laminated stator core composed of a plurality of electrical steel sheets punched out in a shape as shown and superposed in layers, bearing parts 3, 4 fixed on the stator 1 by a bolt 9, a rotor 11 having a rotor shaft 10, and an yoke core 5 of an I-bar shape having bobbins 6, the rotor 11 having a rotor iron core 12 and diecasting portion 13 formed by flowing a diecast material into slant slots on an outer periphery of the rotor 11.

The yoke core 5 of the stator 1 is press-fitted in position after a stator winding 2 is wound thereon, and pole separation notches or grooves 21, 22 are formed on the stator for magnetically separating the inner circumference of a bore 51 into two different magnetic poles when an electric current is supplied to the stator winding 2. The inner circumference of the bore 51 is divided into six sections $\alpha_1$ through $\alpha_6$ each of which are classified as a pole section or a non-pole section such that sections $\alpha_1$, $\alpha_3$ and, $\alpha_4$ and $\alpha_6$ are pole sections and sections $\alpha_2$ and $\alpha_5$ are non-pole sections. A boundary between section $\alpha_1$ and section $\alpha_6$ corressponds to the pole separation groove 21, and similarly, a boundary between section $\alpha_3$ and section $\alpha_4$ corressponds to the pole separation groove 22. The ranges of the sections $\alpha_1$, $\alpha_3$, $\alpha_4$ and $\alpha_6$ are identical to each other and each has the angle of 60° relative to a center of the bore 51, and similarly the ranges of the sections $\alpha_2$ and $\alpha_5$ are identical to each other and each has the angle of 60° relative to a center of the bore 51. In the illustrated embodiment of FIG. 1, all the sections $\alpha_1$ through $\alpha_6$ are designed that each of the sections has the angle of 60°. In modification, some sections such as sections $\alpha_2$, $\alpha_5$ may be designed so that each has the angular degrees in the range of 50°–120° and, in this case, each range $\alpha_1$, $\alpha_3$, $\alpha_4$ and $\alpha_6$ is determined by the formula (360 − 2x (range of section $\alpha_2$))/4.

When each angle of the ranges $\alpha_2$ and $\alpha_5$ is determined to be 60°, the offset angle of adjacent pole sections is equal to 60° and, accordingly, this construction provides substantially a six-pole arrangement similar to the general six-pole motor. Similarly, when each angle of the ranges $\alpha_2$ and $\alpha_5$ is determined to be 90°, the offset angle of adjacent pole sections is equal to 45° and, accordingly, this construction provides substantially an eight-pole arrangement similar to the general eight-pole motor. Thus, selection of the angle of each sections $\alpha_2$, $\alpha_5$ can provide selected pole arrangements such as 7-pole, or 7.5-pole motor and the synchronous rotation of the rotor can be designed selectively.

In the illustrated embodiment, the pole sections and non-pole sections are descriminatively formed by changing the reluctance gap (air gap) between the outer circumference of the rotor 11 and the inner circumference of the bore of the stator 1 so that the air gap of the non-pole sections is designed to be larger than that of the pole section. Thus, in the theoretical sense the non-pole sections are excited in the same polarity as the adjacent pole section, but the provision of larger air gap prevents propagation of the magnetic field of the largely air-gapped sections (i.e., non-pole sections) toward the rotor. Thus, these largely air-gapped sections have substantially no magnetic polarity. In place of the provision of the larger air gaps as disclosed, a preferable shielding element can be applied so as to provide the non-pole sections.

The stator 1 has shading coil slots 23, 24, 25, 26, 27, 28, 29 and 30 for receiving shading coils 16, 17, 18 and 19, and through holes 14, 15 for inserting therethrough fixing bolts such as a bolt 9 for fixing a cover as shown in FIG. 2.

As shown in FIG. 3, the winding 2 is wound on the bobbin 6 of the yoke core 5 and the shading coils 16–19 are disposed in the shading coil slots 23–26, and the squirrel-cage rotor 11 is positioned in the bore of the stator 1. The stator winding 2 wound on the bobbin 6 which includes winding end leader lines 7 and 8 connected to an A. C. power source 50. The shading coils 16, 17, 18 and 19 are wound, respectively, on a first group of slots 23 and 24, a second group of slots 25 and 26, a third group of slots 27 and 28, and a fourth group of slots 29 and 30. The squirrel-cage rotor 11 consists of the rotor shaft 10, rotor core 12 and diecasting portion 13.

In the shaded pole motor according to the present invention, when the power source 50 is electrically connected to the stator winding 2, the sections $\alpha_1$ and $\alpha_3$ (pole section) and the sections $\alpha_4$ and $\alpha_6$ (pole sections) are magnetized alternately into an N-pole and an S-pole. Due to the shading coils 16, 17, 18 and 19 of the pole sections $\alpha_1$, $\alpha_3$, $\alpha_4$, and $\alpha_6$ respectively, which induce a delay in the magnetic fields, a rotational magnetic field is produced in each of the pole sections $\alpha_1$, $\alpha_3$, $\alpha_4$, and $\alpha_6$ to thereby rotate the rotor 11. The adjacent pole sections are offset at an angle of 60° from each other and, accordingly, the pole portions are formed at the same positions as those of the conventional six-pole motor. Thus, the shaded pole motor of the present invention is driven under the performance characteristics which are similar to those of the conventional six-pole motor. Accordingly, the shaded pole motor according to the present invention has a simple structure like the conventional two-pole motor and provides the desired performance characteristics similar to the six-pole motor, without the vibration and noise resulting from cogging of the conventional 2-pole motor.

Figure 5:
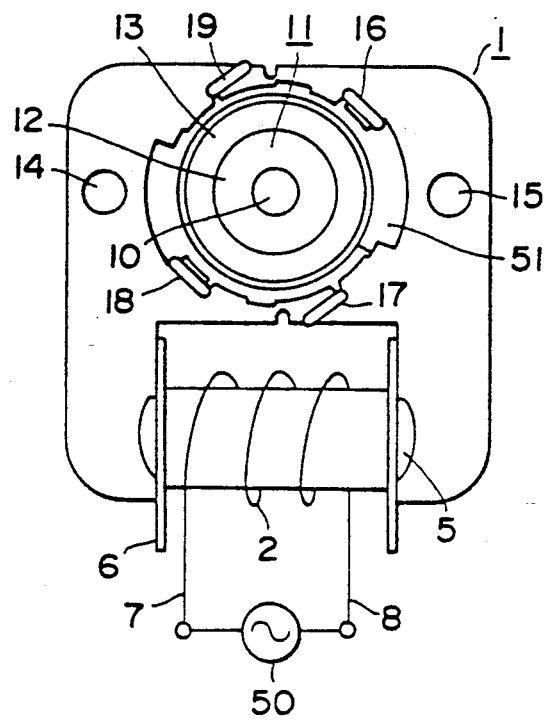
FIG. 5 is a front view of the stator and the rotor according to the modified embodiment shown in FIG. 4.
Figure 4:
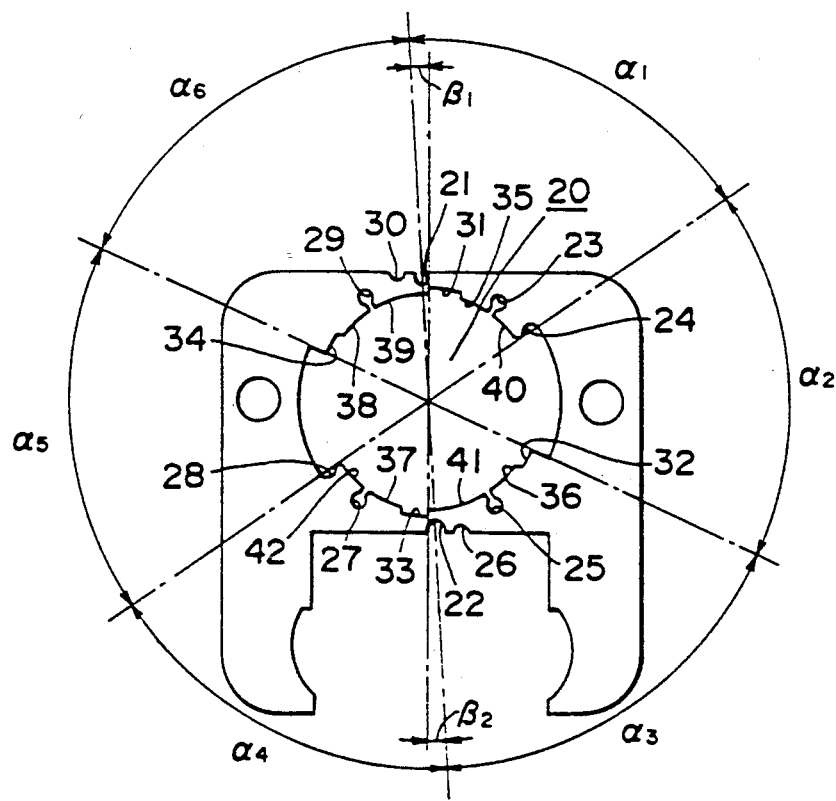
FIG. 4 is a front view of a core used on a stator of the shaded pole motor according to another embodiment of the invention.

FIGS. 4 and 5 show a modification in the stator of the shaded pole motor. An outward appearance is considered to be identical to that of FIG. 2, and like reference numerals represents like parts and elements shown in FIGS. 1-3 in the first embodiment and of FIGS. 4 and 5 of the modification. The structure of the embodiment of FIGS. 4 and 5 is substantially similar to that of the previous embodiment of FIGS. 1 and 3, except for the following features.

In the embodiment of FIGS. 4 and 5, the pole portions have main portions 35, 36, 37 and 38 sub-portions 31, 32, 33 and 34 having larger air gaps to an outer circumference of the rotor than those of the main portions 35-38, and shaded pole portions 39, 40, 41 and 42 with shaded coils wound thereon. The mechanical angles $\beta_1$ and $\beta_2$ (FIG. 4) are set at the angle of 5° in this embodiment, and thus the larger sub-portions 31, 33 are narrowed by the inclination of the angle of 5°, with the result being that a desired mechanical strength at the pole separation grooves 21, 22 is maintained.

According to the present invention, the inner circumference of the bore of the stator is divided into plural sections represented by 2(2n+1), wherein n is an integer more than 1 inclusive, and the sections which are classified into those of the same polarity by means of the pole separation grooves are made into pole sections which are magnetized to an N-polarity and an S-polarity at the time of excitation. The pole sections each has includes a main portion, a sub-portion and a shaded portion. Thus, substantial a increase of poles with a simple construction can be realized. Therefore, the desired performance characteristics obtainable by a multi-pole motor can be realized along with a reduction in vibration and noise. Further, rotation of the rotor can be selectively determined by changing a mechanical angle of the non-pole section. In addition, the sub-portions contributes to a stability in a starting torque and prevention of torque reduction by the third harmonic, which is liable to be produced by the multi-pole motor.

What is claimed is:

1. A shaded pole motor comprising a squirrel-cage rotor and a stator assembly, said stator assembly comprising:

a stator core, a bore for receiving rotatably said rotor, pole separation means for magnetically separating an inner circumference of said bore into two pole portions, a yoke core coupled to said stator core, a single winding wound on said yoke core for magnetizing said two pole portions to an N-pole polarity and an S-pole polarity when said winding is energized by an AC power, a plurality of slots having shading coils disposed therein, said slots formed on said inner circumference of said bore such that said shading coils are associated with said pole portions, wherein each of said two pole portions is magnetically divided into 2n+1 sections, wherein n is an integer of 1 or more, said 2n+1 sections including pole sections for providing a magnetic flux to said rotor for effecting a rotation thereof and at least one non-pole section for providing no magnetic flux for effecting a rotation of said rotor, and wherein said pole sections and said non-pole sections are arranged alternately for each of said two pole portions, wherein pole sections are formed adjacent to said pole separation means and wherein each of said pole sections includes a respective one of said shading coils, and, means for prohibiting a magnetic flux of said non-pole sections from effecting a rotation of said rotor, said shading coil of each of said pole sections producing a magnetic flux when said AC power is supplied to said single winding, said magnetic flux being partly deviated in phase thereof to said pole sections.

2. A shaded pole motor according to claim 1, wherein each of said non-pole sections of said pole portions has an air gap, said air gap being sufficient to prohibit a magnetic effect of said non-pole section to an outer circumference of said rotor.

3. A shaded pole motor according to claim 1, wherein each of said pole sections of said two pole portions has a main portion having a relatively small gap to said rotor, a sub-portion having a larger gap to said rotor, and a shading pole portion having said shading coil.

4. A shaded pole motor according to claim 2, wherein each of said pole sections of said two pole portions has a main portion having a relatively small gap to said rotor, a sub-portion having a larger gap to said rotor, and a shading pole portion having said shading coil.

5. A shaded pole motor according to claim 1, wherein n equals 1 such that each of said two pole portions is divided into three sections, said sections defining arcs having a same angle with respect to each other.

6. A shaded pole motor according to claim 2, wherein n equals 1 such that each of said two pole portions is divided in to three sections, said sections defining arcs having a same angle with respect to each other.

7. A shaded pole motor according to claim 1, wherein n equals 1 such that each of said two pole portions is divided into three sections and said bore is magnetically divided into six sections, said six sections consisting of four pole sections and two non-pole sections, said pole sections each having a first angular width relative to said bore, said non-pole sections each having a second angular width relative to said bore, wherein the first angular width in degrees of each of said pole sections equal:

$$(360° - (2 \times \Theta°))/4$$

wherein $\Theta°$ is the second angular width in degrees of each of said non-pole sections relative to a center of said bore.

* * * * *